(12) United States Patent
Han et al.

(10) Patent No.: US 11,394,948 B2
(45) Date of Patent: Jul. 19, 2022

(54) DISPLAY APPARATUS AND METHOD OF CONTROLLING THE SAME

(71) Applicant: SAMSUNG ELECTRONICS CO., LTD., Suwon-si (KR)

(72) Inventors: Sunbum Han, Suwon-si (KR); Daesung Lim, Suwon-si (KR); Bumkwi Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/136,814

(22) Filed: Dec. 29, 2020

(65) Prior Publication Data

US 2021/0203906 A1 Jul. 1, 2021

(30) Foreign Application Priority Data

Dec. 30, 2019 (KR) .......................... 10-2019-0177937

(51) Int. Cl.
*H04N 13/194* (2018.01)
*H04N 13/139* (2018.01)
*H04N 13/161* (2018.01)
*G06F 3/14* (2006.01)

(52) U.S. Cl.
CPC ......... *H04N 13/194* (2018.05); *G06F 3/1454* (2013.01); *H04N 13/139* (2018.05); *H04N 13/161* (2018.05)

(58) Field of Classification Search
None
See application file for complete search history.

(56) References Cited

U.S. PATENT DOCUMENTS

| | | | |
|---|---|---|---|
| 9,965,239 B2 | 5/2018 | Ohashi et al. | |
| 2012/0070085 A1 | 3/2012 | Arn | |
| 2013/0278828 A1 | 10/2013 | Todd | |
| 2013/0328892 A1 | 12/2013 | Park et al. | |
| 2016/0098963 A1* | 4/2016 | Kim | H04N 5/57 345/690 |

FOREIGN PATENT DOCUMENTS

| | | | |
|---|---|---|---|
| KR | 10-1346709 B1 | | 1/2014 |
| KR | 101346709 | * | 1/2014 |
| KR | 1020160039479 A | | 4/2016 |

OTHER PUBLICATIONS

International Search Report (PCT/ISA/210) dated Apr. 15, 2021 issued by the International Searching Authority in International Application No. PCT/KR2020/019423.

* cited by examiner

*Primary Examiner* — Christopher Braniff
(74) *Attorney, Agent, or Firm* — Sughrue Mion, PLLC

(57) ABSTRACT

The display apparatus includes a display; a communication interface configured to communicate with a user terminal; and a controller configured to generate a multi-view image including a plurality of contents by performing an image quality improvement process based on source image signals received from a plurality of sources, and to control the multi-view image to be displayed on the display.

18 Claims, 13 Drawing Sheets

DISPLAY APPARATUS AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0177937, filed on Dec. 30, 2019, the disclosure of which is incorporated herein by reference in its entirety.

BACKGROUND

1. Field

The disclosure relates to a display apparatus that outputs a multi-view screen, and a method of controlling the same.

2. Description of Related Art

With a development of electronic technology, various types of electronic devices have been developed and distributed. In particular, in a case of TV, it is possible to provide a three-dimensional (3D) content or a content with a higher resolution. Accordingly, in broadcasting technology, contents including a plurality of images such as the 3D content, a multi-angle content, a content including a depth image are provided.

Recent display apparatuses may also provide UHD-quality content. In addition, as a display screen becomes larger, the entire display screen may be divided and various contents may be simultaneously displayed on each divided screen.

On the other hand, such a screen may be output not only to the display apparatus but also to other devices through transmission and reception of image signals.

SUMMARY

Provided are a display apparatus capable of providing various viewing environments and increasing user convenience by outputting a part of a multi-view screen to a user terminal based on a user's selection, and a method of controlling the display apparatus.

Additional aspects will be set forth in part in the description which follows and, in part, will be apparent from the description, or may be learned by practice of the presented embodiments.

According to an aspect of the disclosure, there is provided a display apparatus including: a display; a communication interface configured to communicate with a user terminal; and a controller configured to generate a multi-view image including a plurality of contents by performing an image quality improvement process based on source image signals received from a plurality of sources, and to control the multi-view image to be displayed on the display. The controller may be configured to control the communication interface so that an image signal of the multi-view image is transmitted to the user terminal, and to in response to the selection of at least one of the plurality of contents, control the communication interface so that an image signal of a part of the multi-view image corresponding to the selected content is transmitted to the user terminal.

The controller may include an image quality controller configured to perform the image quality improvement process of the source image signal; a size controller configured to determine a resolution and size of the at least some of the multi-view images; a frame controller configured to change a frame rate of the multi-view image; and a screen selector configured to select the part of the multi-view image based on a user command.

The image quality controller may be configured to perform the image quality improvement process based on the analysis of the source image signal.

The controller may be configured to form a constant multi-view image signal based on the source image signal, and to transmit the image signal of the part of the multi-view image or the constant multi-view image signal to the user terminal based on a user command.

The controller may be configured to form the image signal of the part of the multi-view image by performing encoding with a capacity suitable for transmission of the user terminal.

The user terminal may be configured to decode the received image signal of the part of the multi-view image into a signal corresponding to the user terminal and output the decoded signal to the user terminal.

The communication interface may be configured to receive display information corresponding to the user terminal from the user terminal. The controller may be configured to convert the image signal of the part of the multi-view image to correspond to the display information and transmit the converted signal to the user terminal.

The controller may be configured to transmit the image signal of the part of the multi-view image corresponding to an image in which the part of the multi-view image of a plurality of regions selected by a user is arranged in a predetermined array to the user terminal.

The controller may be configured to change the part of the multi-view image based on a user command.

The controller may be configured to form the multi-view image including the image output to the user terminal.

According to an aspect of the disclosure, there is provided a method of controlling a display apparatus including: communicating, by a communication interface, with a user terminal; generating, by a controller, a multi-view image including a plurality of contents by performing an image quality improvement process based on source image signals received from a plurality of sources; controlling, by the controller, the multi-view image to be displayed on a display; controlling, by the controller, the communication interface so that an image signal of the multi-view image is transmitted to the user terminal; and in response to the selection of at least one of the plurality of contents, controlling, by the controller, the communication interface so that an image signal of a part of the multi-view image corresponding to the selected content is transmitted to the user terminal.

The performing of the image quality improvement process may include determining a resolution and size of the at least some of the multi-view images; and changing a frame rate of the multi-view image.

The performing of the image quality improvement process may include performing the image quality improvement process based on the analysis of the source image signal.

The method may further include forming, by the controller, a constant multi-view image signal based on the source image signal; and transmitting, by the controller, the image signal of the part of the multi-view image or the constant multi-view image signal to the user terminal based on a user command.

The method may further include forming, by the controller, the image signal of the part of the multi-view image by performing encoding with a capacity suitable for transmission of the user terminal.

The method may further include decoding, by the user terminal, the received image signal of the part of the multi-view image into a signal corresponding to the user terminal and output the decoded signal to the user terminal.

The method may further include receiving, by the communication interface, display information corresponding to the user terminal from the user terminal; and converting, by the controller, the image signal of the part of the multi-view image to correspond to the display information and transmit the converted signal to the user terminal.

The method may further include transmitting, by the controller, the image signal of the part of the multi-view image corresponding to an image in which the part of the multi-view image of a plurality of regions selected by a user is arranged in a predetermined array to the user terminal.

The method may further include changing, by the controller, the part of the multi-view image based on a user command.

The method may further include forming, by the controller, the multi-view image including the image output to the user terminal.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
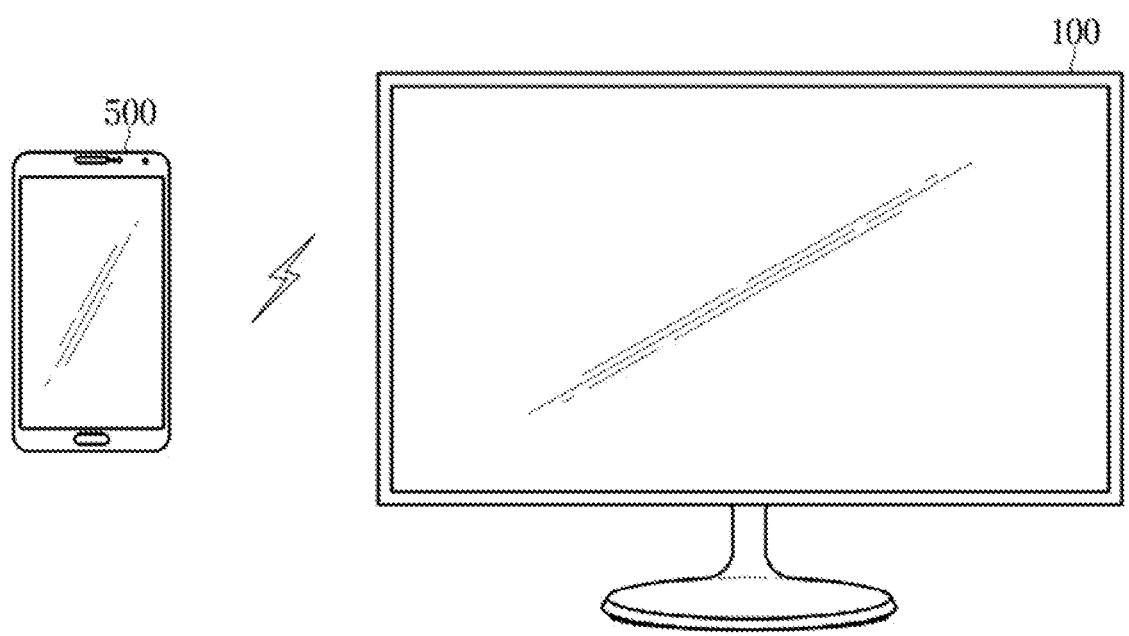
FIG. 1 is a view illustrating a relationship between a user terminal and a display apparatus according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 2:
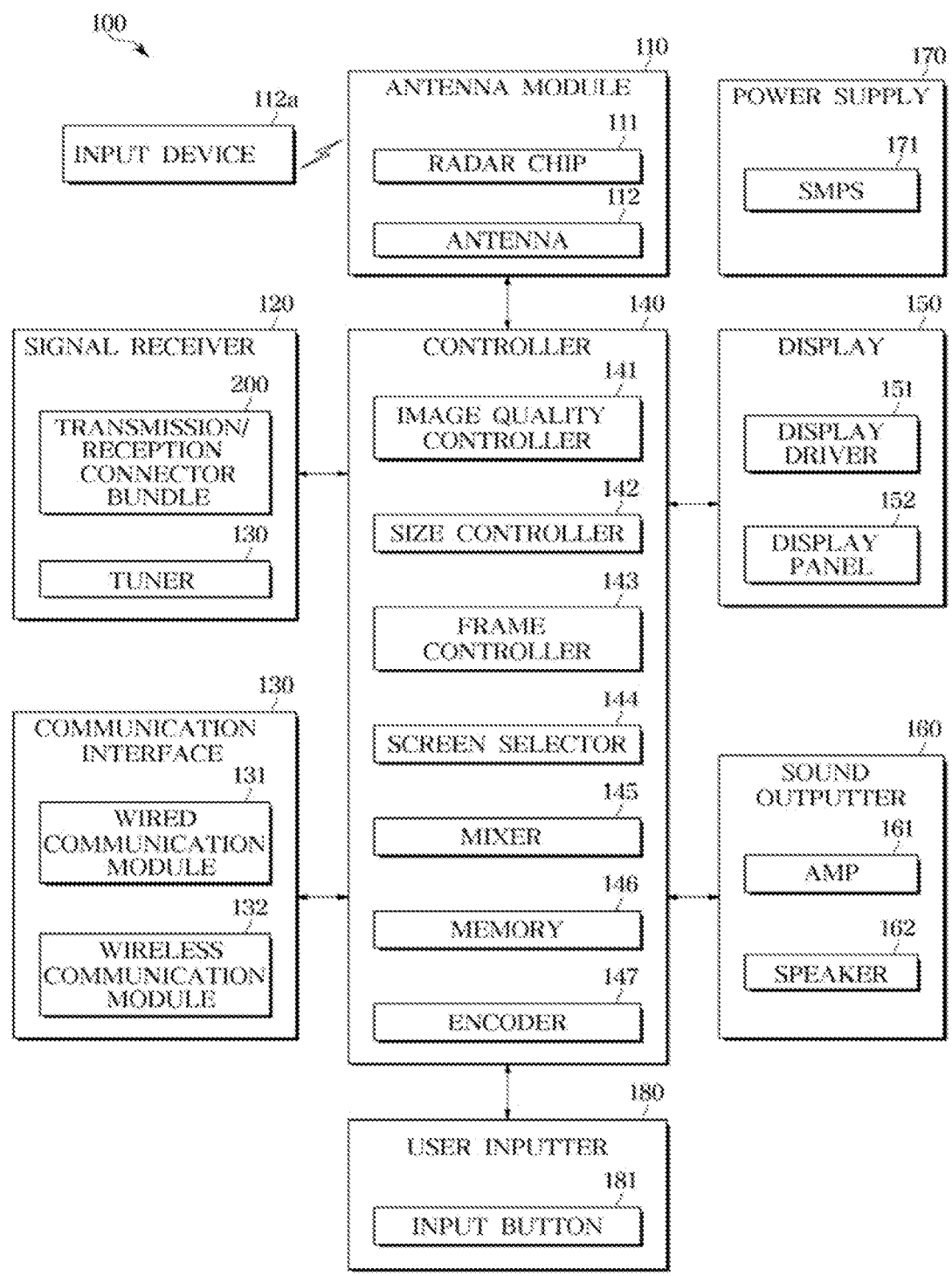
FIG. 2 is a control block diagram of a display apparatus according to an embodiment.

FIG. 1 is a view illustrating a relationship between a user terminal and a display apparatus according to an embodiment, and FIG. 2 is a control block diagram of a display apparatus according to an embodiment.

Referring to FIGS. 1 and 2, a display apparatus 100 may communicate with a user terminal 500.

Particularly, a user inputs a command through the user terminal 500, and the user terminal 500 may transmit a user command to the display apparatus 100.

In addition, the display apparatus 100 may transmit an image signal generated in the display apparatus 100 to the user terminal 500.

The user terminal 500 may output the received image signal to a display provided in the user terminal 500.

Referring to FIG. 2, the display apparatus 100 may include may include an antenna module 110 to receive a signal from an input device 112a, a user inputter 180 to receive a user's input from a user, a communication interface 130 (e.g., a transceiver) to communicate with the user terminal 500, a controller 140 to control the operation of the display apparatus 100 and process video signals and/or audio signals received from a signal receiver 120 and/or the communication interface 130, a display 150 to display an image processed by the controller 140, a sound outputter 160 to output sound processed by the controller 140, and a power supply 170 to supply power to the components of the display apparatus 100.

The antenna module 110 may include a radar chip 111 capable of transmitting and receiving a signal composed of a specific pulse component of a predetermined frequency band. However, the antenna module 110 is not necessarily included in the display 150, and according to embodiments, the display apparatus 100 may not include the antenna module 110.

The display apparatus 100 may receive a user input regarding a change of an image source device through an antenna 112.

The controller 140 may form a multi-view image based on source image signals received from a plurality of sources.

The plurality of sources may refer to On Air, HDMI, IPTV, Cable TV, and USB.

The controller 140 may generate a multi-view image including a plurality of contents by performing an image quality improvement process based on the source image signals received from the plurality of sources.

The image quality improvement process may include Detail Enhancement (DE), Contrast Enhancement (CE), and Noise Reduction (NR). A detailed description of this will be described later.

The controller 140 may control the multi-view image to be displayed on the display 150.

The controller 140 may control the communication interface 130 so that the image signal of the multi-view image is transmitted to the user terminal 500.

When at least one of the plurality of contents is selected, the controller 140 may control the communication interface 130 so that a partial image signal of the multi-view image corresponding to the selected content is transmitted to the user terminal 500.

The selected content may correspond to a part of the multi-view image, and the controller 140 may transmit the content corresponding to the part of the multi-view image and the image signal of the content to the user terminal 500.

The multi-view image may refer to an image in which the plurality of contents are output on one screen.

The controller 140 may transmit the image signal corresponding to the part of the multi-view image selected by a user command to the user terminal 500.

That is, the user may select the part of the multi-view image, and the controller 140 may generate the image signal by cropping the selected part.

Meanwhile, the controller 140 may improve the quality of the source image signals in generating the multi-view image.

Meanwhile, the controller 140 may include an image quality controller 141, e.g., a microprocessor, for improving the quality of the source image signal, a size controller 142 for determining a resolution and size of at least some of the multi-view images, a frame controller 143 for changing a frame rate of the multi-view image, and a screen selector 144 for selecting the part of the multi-view image based on the user command.

In addition, the controller 140 may include a mixer 145 for collecting image signals and an encoder 147 for encoding signals.

The image quality controller 141 may perform the image quality improvement process.

The image quality improvement based on analysis of the source image may include Detail Enhancement (DE), Contrast Enhancement (CE), and Noise Reduction (NR).

However, the disclosure is not limited thereto, and other image quality improvements may be included in addition to the image quality improvement mentioned above.

In addition, the image quality controller 141 may improve image quality of the source image signal.

On the other hand, when the frame rate is improved, the number of images output per hour increases, and the image quality may be improved.

The controller 140 may form a multi-view image signal based on the source image signal. The controller 140 may transmit the partial image signal of the multi-view image or may transmit a constant multi-view image signal to the user terminal 500 based on the user command.

The controller 140 may generate the constant multi-view image signal corresponding to the multi-view image itself in addition to the improved multi-view image. The controller 140 may selectively transmit the multi-view image signal or the image signal corresponding the part of the multi-view image to the user terminal 500.

The controller 140 may form the image corresponding to the part of the multi-view image by performing encoding at a capacity suitable for transmission of the user terminal 500.

That is, the image signal with the improved image quality may be encoded as a signal optimized for the user terminal 500 and transmitted to the user terminal 500.

The user terminal 500 may decode the encoded and received image signal into the signal corresponding to the user terminal 500 and output it to the user terminal 500.

The controller 140 may transmit to the user terminal 500 an image signal arranged in a predetermined array of some of the multi-view images of a plurality of regions selected by the user.

That is, the user may select the plurality of regions in the multi-view image, and the plurality of regions may be arranged in a predetermined arrangement. The display apparatus 100 may transmit the image signal including all such information to the user terminal 500.

The controller 140 may change the part of the multi-view image based on the user command. The user may change the part of the multi-view image displayed on the user terminal 500.

Scrolling and dragging may be used when the user changes the part of the multi-view image.

The controller 140 may form the multi-view image including the image output to the user terminal 500. When the display apparatus 100 communicates with the user terminal 500, the image output by the user terminal 500 may be output in the part of the multi-view image based on a source transmitted from the user terminal 500.

The controller 140 may convert some image signals of the multi-view image to correspond to display information corresponding to the user terminal 500 and transmit it to the user terminal 500.

Particularly, the display apparatus 100 may receive the display information corresponding to the user terminal 500 through the communication interface 130. The display information may be information about a display included in the user terminal 500, and the display information may include a resolution, brightness, and gamma curve of the user terminal display, but is not limited thereto.

The controller 140 may convert the image signal to match each user terminal 500.

The conversion of the image signal by the controller 140 may include image quality processing and changing the size of the image.

Particularly, the controller 140 may change the image signal based on the resolution of the display apparatus included in the user terminal 500.

For example, when the user terminal 500 is a device that supports Full HD resolution (1920×1080), the display apparatus 100 may convert the image signal into Full HD resolution and transmit it to the user terminal 500. The controller 140 may process image frame data and/or video/audio signals received by the signal receiver 120 or the communication interface 130.

That is, the controller 140 may receive the plurality of sources through the signal receiver 120 and the communication interface 130. The plurality of sources may refer to broadcast signals, High Definition Multimedia Interface (HDMI) signals, Internet Protocol Television (IPTV), and the like.

For example, the controller 140 may output the image frame data received from the signal receiver 120 to the display 150. In addition, the controller 140 may process the video/audio signals received by the signal receiver 120 and/or the communication interface 130, and may output the image frame data generated from the video/audio signals to the display 150.

The controller 140 may control the operations of the signal receiver 120, the display 150, and the sound outputter 160 according to the operation state of the display apparatus 100 and/or a user input. For example, when a content source is selected by a user input, the controller 140 may control the signal receiver 120 to receive image frame data from the selected content source. In addition, when the image frame data is not received through the signal receiver 120, the controller 140 may control the signal receiver 120 to receive image frame data from another content source.

In particular, the controller 140 may output a selection signal for selecting a source from which to receive image frame data to a transmission/reception connector bundle 200 of the signal receiver 120. The controller 140 may further include a memory 146.

The memory 146 may store programs and data for processing image frame data and/or video/audio signals, and may temporarily memorize data generated during processing of the image frame data and/or video/audio signals. In addition, the memory 146 may store programs and data for controlling the components included in the display apparatus 100 and temporarily memorize data generated during the control of the components included in the display apparatus 100.

The memory 146 may include a non-volatile memory for storing data for a long time, such as a read only memory (ROM) and a flash memory, and a volatile memory for temporarily memorizing data, such as a static random access memory (S-RAM), Dynamic Random Access Memory (D-RAM).

The controller 140 may receive image frame data and/or video/audio signals from the signal receiver 120 and/or the communication interface 130. The controller 140 may output the image frame data received from the signal receiver 120 to the display 150 and the sound outputter 160. In addition, the controller 140 may decode the video signal to generate image frame data, decode the audio signal to generate sound data, and output the image frame data and sound data to the display 150 and the sound outputter 160, respectively.

The controller 140 may receive a user input from the user inputter 180, and controls a control signal for controlling the signal receiver 120 and/or the display 150 and/or the sound outputter 160 according to the user input. In addition, the controller 140 may generate a control signal for controlling the operation of the signal receiver 120 according to whether image frame data is received through the signal receiver 120.

The controller 140 may include an arithmetic circuit that performs logical operations and arithmetic operations, and a memory circuit that memorizes calculated data.

The controller 140 may convert sound data decoded from the audio signal into an analog acoustic signal, and an amplifier 161 may amplify the analog sound signal output from the controller 140.

The user inputter 180 may include an input button group 181 that receives a user input.

For example, the user inputter 180 may include a power button for turning on or off the display apparatus 100, a channel selection button for selecting broadcast content displayed on the display apparatus 100, a sound control button for adjusting the volume of the sound output from the display apparatus 100, a source selection button for selecting a content source, and the like.

The input button group 181 may receive respective user inputs and output electrical signals corresponding to the user inputs to the controller 140. The input button group may be implemented using various input devices, such as a push switch, a touch switch, a dial, a slide switch, a toggle switch, and the like.

The tuner 122 may receive a broadcast signal from a broadcast reception antenna or a wired cable, and extract a broadcast signal of a channel selected by a user from among the broadcast signals. For example, the tuner 122 may pass a broadcast signal having a frequency corresponding to a channel selected by a user among a plurality of broadcast signals received through the broadcast reception antenna or the wired cable, and block a broadcast signal having a different frequency.

As such, the signal receiver 120 may receive image frame data and/or video/audio signals through the transmission/reception connector bundle 200 and/or the tuner 122, and output the image frame data and/or video/audio signals received through the transmission/reception connector bundle 200 and/or the tuner 122 to the controller 140.

The communication interface 130 may include a wired communication module 131 and a wireless communication module 132 that may exchange data with external devices.

The communication interface 130 may communicate with the user terminal 500.

The display apparatus 100 may transmit the image signal to the user terminal 500.

The user terminal 500 may be implemented as a computer or portable terminal capable of accessing the display apparatus 100 through a network. Here, the computer may include, for example, a notebook equipped with a web browser, a desktop, a laptop, a tablet PC, a slate PC, and the like. The portable terminal is a wireless communication device that guarantees portability and mobility, and may include, for example, all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) terminals, smart phones, etc. The portable terminal may include a wearable device such as a watch, a ring, a bracelet, anklets, a necklace, glasses, contact lenses, or a head-mounted-device (HMD).

The wired communication module 131 may be connected to a communication network through a cable and exchange data with an external device through the communication network. For example, the wired communication module 131 is connected to a communication network through Ethernet (Ethernet, IEEE 802.3 technology standard), and exchanges data with image source devices and/or external devices through the communication network.

The wireless communication module 132 may wirelessly communicate with an access point (AP), and connect to a communication network through the AP and exchange data with the image source devices and/or the external devices through the communication network. For example, the wireless communication module 132 may communicate with the AP through Wi-Fi (WiFi™, IEEE 802.11 technology standard), Bluetooth (Bluetooth™, IEEE 802.15.1 technology standard), and/or ZigBee™ (IEEE 802.15.4 technology standard). The wireless communication module 132 may exchange data with an external device through the AP.

The communication interface 130 may receive image frame data through the communication network.

The display 150 may include a display panel 152 for visually displaying an image, and a display driver 151 for driving the display panel 152.

The display panel 152 may generate an image according to image data received from the display driver 151 and display the image.

The display panel 152 may include a pixel that serves as a unit for displaying an image. Each pixel may receive an electrical signal representing an image from the display driver 151, and output an optical signal corresponding to the received electrical signal. As such, optical signals output from a plurality of the pixels are combined so that one image may be displayed on the display panel 152.

The display driver 151 may receive image data from the controller 140 and drive the display panel 152 to display an image corresponding to the received image data. Particularly, the display driver 151 may transmit an electrical signal corresponding to image data to each of a plurality of pixels constituting the display panel 152.

When the display driver 151 transmits an electrical signal corresponding to image data to each pixel constituting the display panel 152, each pixel outputs light corresponding to the received electrical signal, and light output from each pixel is combined to form an image.

The sound outputter 160 includes the amplifier 161 for amplifying sound, and the speaker 162 for acoustically outputting the amplified sound.

The speaker 162 may convert the analog acoustic signal amplified by the amplifier 161 into sound (a sound wave). For example, the speaker 162 may include a thin film that vibrates according to an electrical acoustic signal, and sound waves may be generated by the vibration of the thin film.

The speaker 162 may output the sound signal included in the content.

The power supply 170 may supply power to the user inputter 180, the signal receiver 120, the communication interface 130, the controller 140, the display 150, the sound outputter 160, and all other components.

The power supply 170 may include a switching mode power supply 171 (hereinafter, referred to as 'SMPS').

The SMPS 171 may include an AC-DC converter that converts AC power of an external power source into DC power, and a DC-DC converter that changes the voltage of the DC power. For example, AC power of an external power source is converted to DC power by the AC-DC converter, and the voltage of the DC power may be changed to various voltages (for example, 5V and/or 15V) by the DC-DC converter. The DC power with varying voltages may be supplied to the user inputter 180, the signal receiver 120, the controller 140, the display 150, the sound outputter 160, and all other components.

In addition, the transmission/reception connector bundle 200 may include a switch part 230 for selecting source of image frame data.

At least one component may be added or omitted to correspond to the performances of the components of the display apparatus illustrated in FIG. 2. In addition, it would be understood by those skilled in the art that the mutual positions of the components may be changed to correspond to the performance or structure of the system.

Meanwhile, the components illustrated in FIG. 2 may refer to a software component and/or a hardware component, such as a Field Programmable Gate Array (FPGA) and an Application Specific Integrated Circuit (ASIC).

Figure 3:
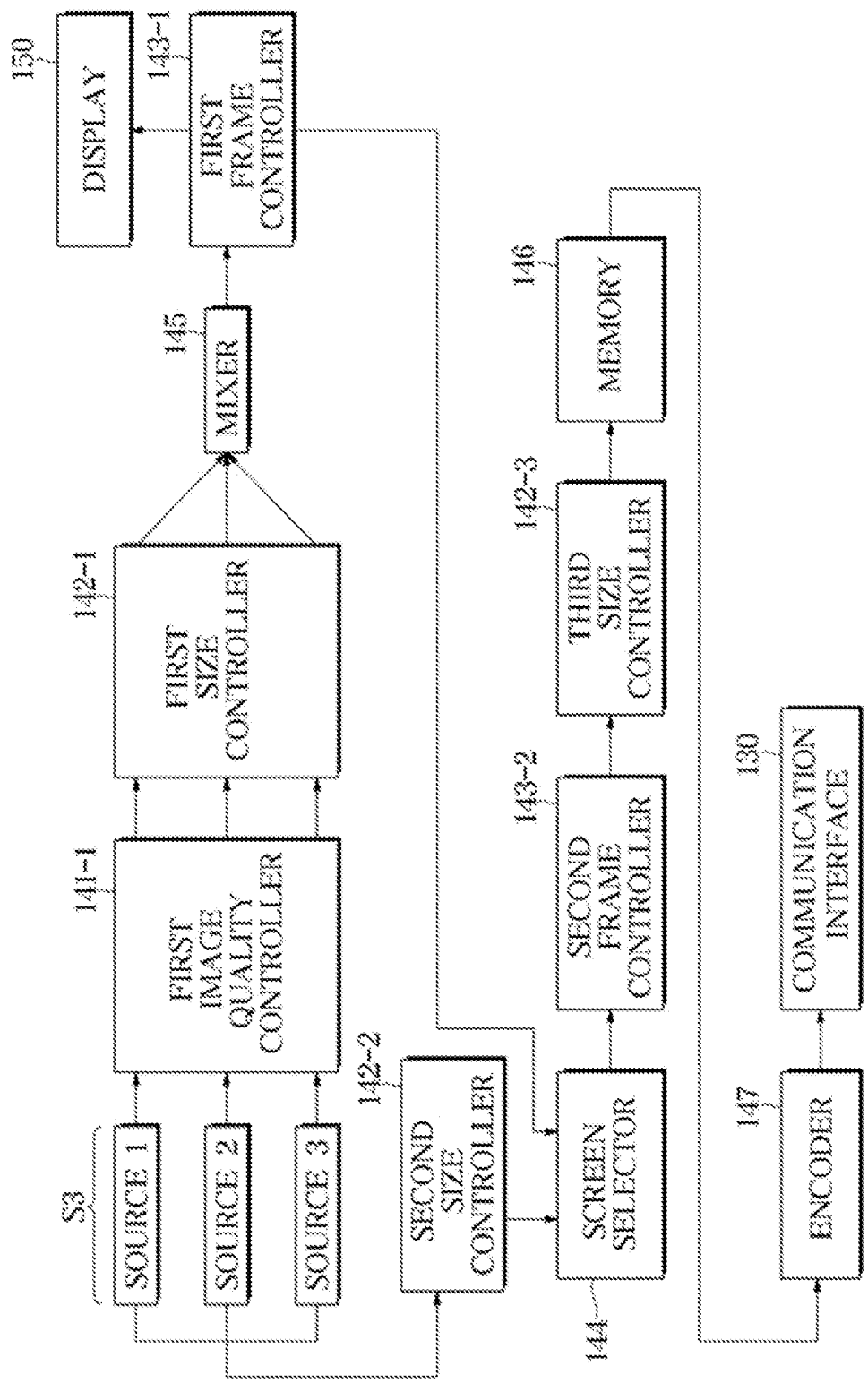
FIGS. 3, 4, and 5 are views illustrating a detailed configuration of a controller according to an embodiment.
Figure 4:
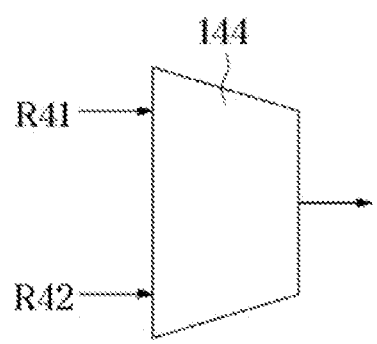
Figure 5:
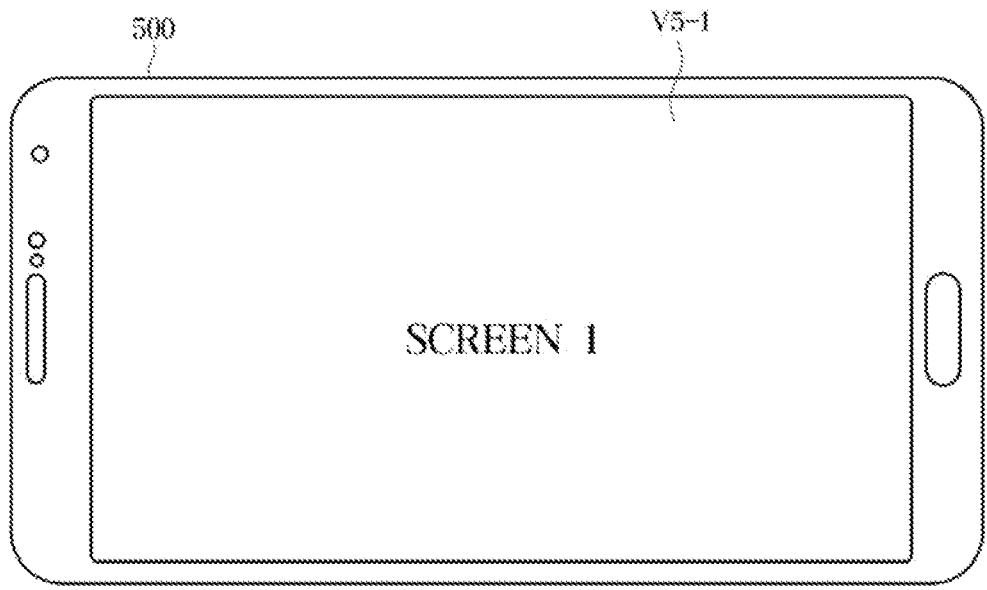
Figure 5:
Figure 5:
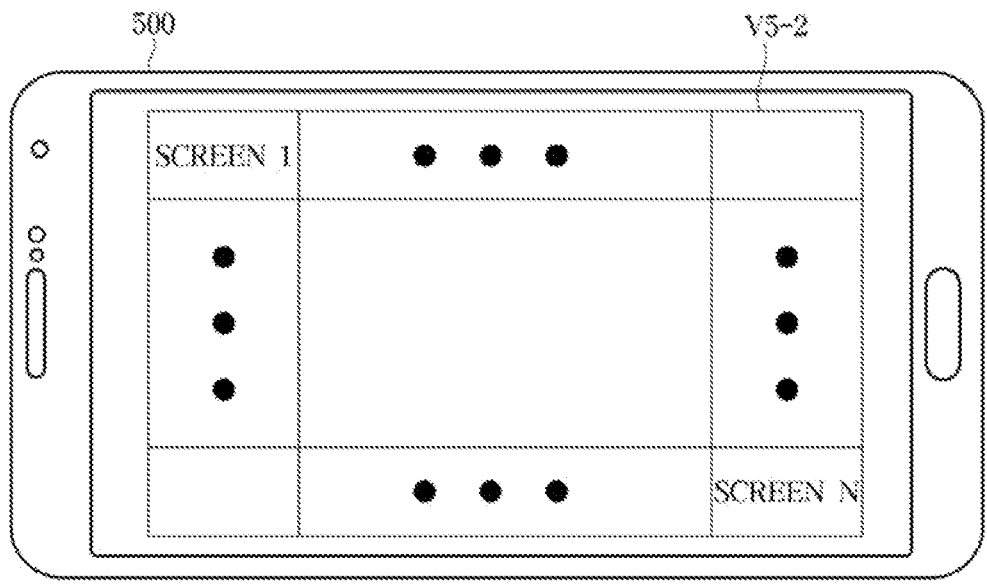

FIGS. 3 to 5 are views illustrating a detailed configuration of a controller according to an embodiment.

Referring to FIG. 3, the controller 140 may include image quality controllers 141-1 and 141-2, size controllers 142-1, 142-2, and 142-3, and the screen selector 144.

The first image quality controller 141-1 may improve the image quality by receiving the plurality of sources. In improving image quality. In improving the image quality, the first image quality controller 141-1 may perform the Detail Enhancement (DE), the Contrast Enhancement (CE), and the Noise Reduction (NR).

The Detail Enhancement (DE) may refer to an operation of improving a portion corresponding to a detail of the image based on the source image signal.

The Contrast Enhancement (CE) may refer to an operation of analyzing the image based on the source image signal and changing a range of shadows appropriately to the screen to sharpen the image.

The Noise Reduction (NR) may refer to an operation of removing a noise by classifying the image and the noise by analyzing a temporal spatial characteristic of the image.

Meanwhile, the first image quality controller 141-1 may perform a deep learning super resolution through texture formation and deep learning.

Texture creation may refer to an operation of analyzing an input image to create a texture and outputting a low-resolution image like a high-resolution image.

Meanwhile, after the image quality is improved in the first image quality controller 141-1, the image signal may be transmitted to the first size controller 142-1.

The first size controller 142-1 may adjust the resolution and size of the image signal according to the size displayed on the screen.

Meanwhile, the image signal whose resolution and size have been changed by the first size controller 142-1 may be merged in the mixer 145, and the merged signal may be increased by a frame in a first frame controller 143-1.

Particularly, the first frame controller 143-1 may perform a frame rate conversion.

FRC may refer to an operation of raising the frame rate according to the display and generating and outputting an interpolation frame according to a motion prediction or a motion compensation method.

The first frame controller 143-1 may remove a drag phenomenon of a motion image displayed by this operation.

Meanwhile, the first frame controller 143-1 may perform motion judder correction (MJC).

The MJC may refer to an operation of removing motion that occurs when a display frame rate or an input/output transmission frame rate is changed.

The first frame controller 143-1 may generate an improved image by removing the motion of the image signal.

In summary, the source image signal may form the multi-view image with the improved image quality based on the above-described operation. Since the image quality of the multi-view image is improved, the part of the multi-view image may be cropped based on the user command and transmitted to the user terminal 500.

Also, the multi-view image formed by the above-described operation may be output to the display 150 of the display apparatus 100.

Particularly, the screen selector 144 included in the controller 140 may crop and reconstruct only the screen that the user of the other device wants to see among the screens output to the display apparatus 100.

Meanwhile, a source signal S3 may form the multi-view image without undergoing the above-described image quality improvement operation.

Particularly, the source signal S3 may form the multi-view image through the second size controller 142-2.

Referring to FIG. 4, the screen selector 144 may receive both an image R41 with improved image quality and a multi-view image R42 with no improved image quality based on the above-described operation.

Particularly, the image signal that has not performed the image quality improvement operation from the source signal may be formed as the constant multi-view image signal R42.

The constant multi-view image signal R42 is the image formed separately from the multi-view image output to the display apparatus 100, and may refer to a signal formed independently from the multi-view image output to the display apparatus 100.

Referring to FIGS. 4 and 5, when the screen selector 144 receives the image signal through two paths, the display apparatus 100 may provide the multi-view image to the user terminal 500 even when a viewer of the display apparatus 100 watches a multi-view (V5-2) and then switches to a single channel (V5-1).

Referring back to FIG. 3, the image signal selected by the screen selector 144 may be transmitted to the second frame controller 143-2 again.

The image signal transmitted to the second frame controller 143-2 may convert the frame rate to match the output of the user terminal 500.

In addition, the image signal that has passed through the second frame controller 143-2 may be changed to the resolution and size corresponding to the user terminal 500 in the third size controller 142-3.

In addition, when the frame and scale of the image signal are changed, the encoder 147 included in the controller 140 may encode the image signal with the capacity suitable for transmission of the user terminal 500.

The image signal finally formed may reduce data of the image signal for bandwidth constraints on a wireless communication system or quality of service (QoS) with sufficient wireless channel environment.

Meanwhile, the encoded image signal may be decoded in the user terminal 500 and output from the user terminal 500.

Meanwhile, the encoder 147 may be encoded with a codec that can be finally output from the user terminal 500 and transmitted to the user terminal 500.

Figure 6:
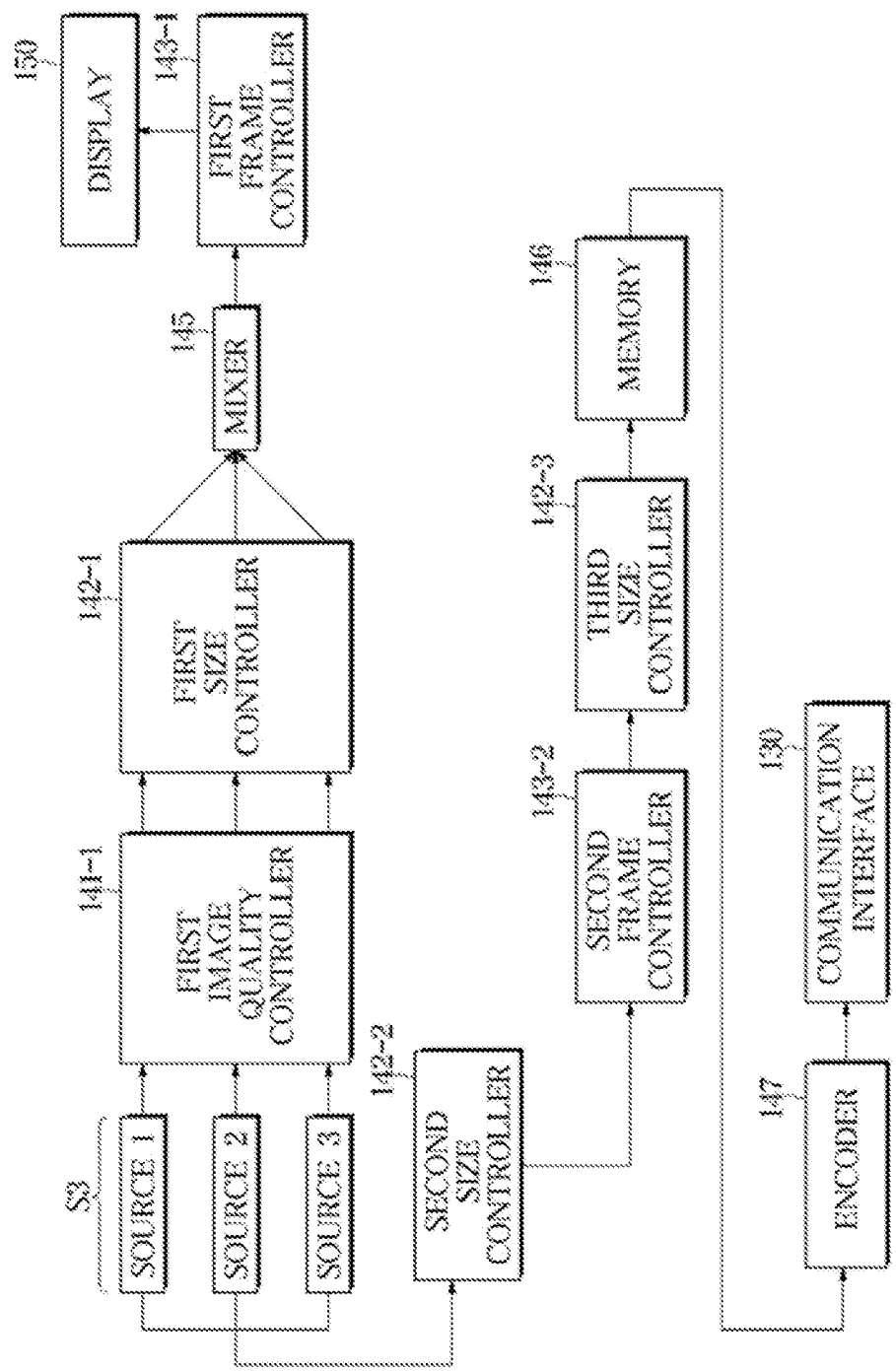
FIG. 6 is a view illustrating a configuration of a controller according to an embodiment.

FIG. 6 is a view illustrating a configuration of a controller according to an embodiment.

The configuration of the controller 140 illustrated in FIG. 6 does not allow the user to select the part of the screen, but outputs the improved multi-view image to the display apparatus 100. The image signal of the multi-view image transmitted to the user terminal 500 may be transmitted to the user terminal 500 through a separate path.

In this case, the part of the multi-view image is cropped and cannot be transmitted to the user terminal 500, but the display apparatus 100 may transmit the optimized multi-view image to the user terminal 500.

Figure 7:
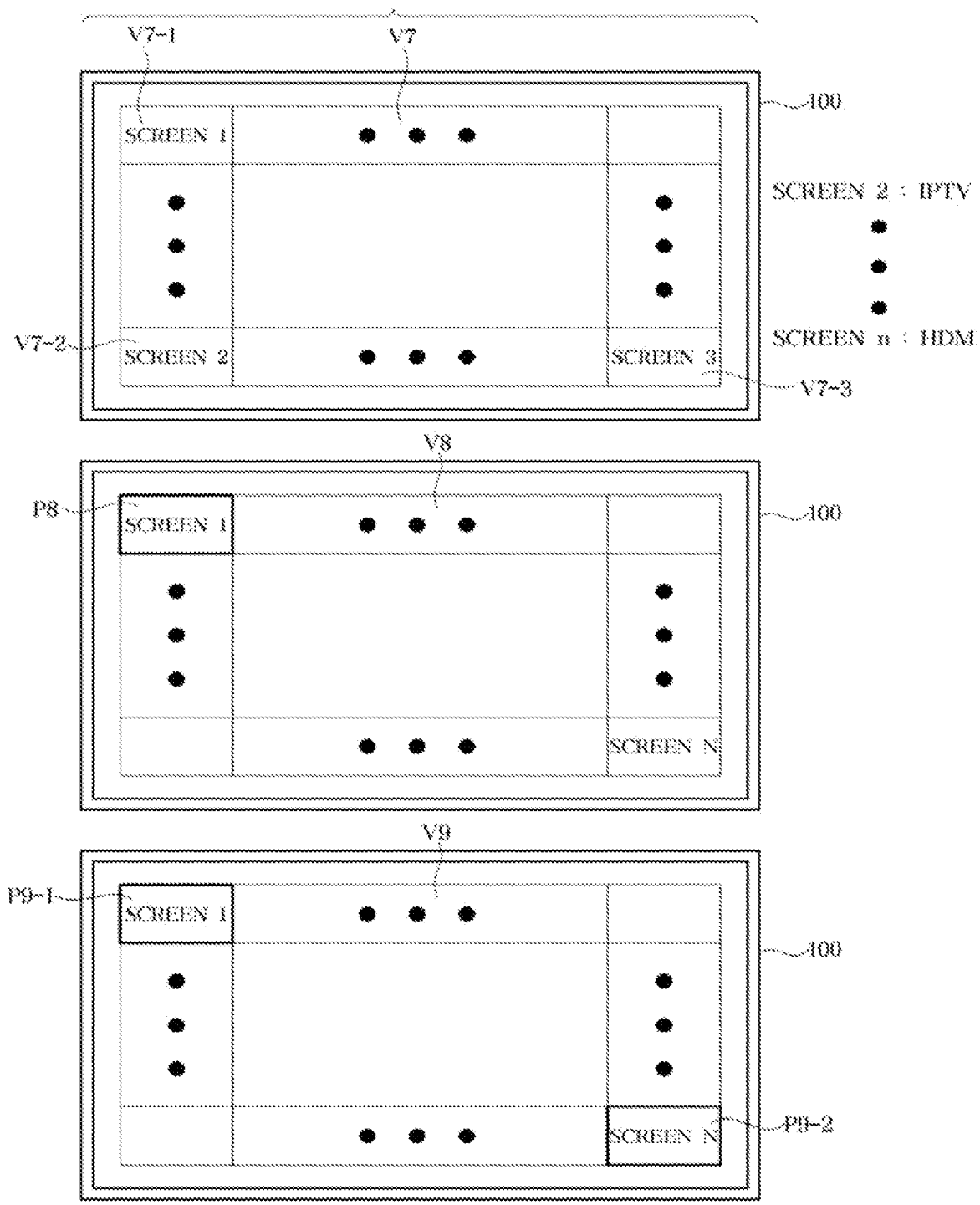
FIG. 7 is a view illustrating an operation of selecting a multi-view image and a part of the multi-view image by a user according to an embodiment.

FIG. 7 is a view illustrating an operation of selecting a multi-view image and a part of the multi-view image by a user according to an embodiment.

Referring to FIG. 7, a multi-view image V7 may be formed based on image signals transmitted from the plurality of sources.

Particularly, FIG. 7 illustrates the multi-view image V7 made of a content V7-1 formed based on a broadcast signal, a content V7-2 formed of a signal received from the internet, and a content V7-3 formed of the image signal received from HDMI.

The above-described multi-view image illustrates what is output to the display apparatus 100, and thus illustrates that the image quality improvement operation has been performed.

Meanwhile, the user may receive the image signal corresponding to a multi-view image through the user terminal 500 based on the above-described operation.

Meanwhile, the user may receive and output the multi-view image as it is, but may output some content selected from the multi-view image to the user terminal 500.

When the user selects a part P8 of a multi-view image V8, the controller 140 of the display apparatus 100 may transmit the image cropped from the multi-view image to the user terminal 500 to provide the corresponding image to the user.

The user may select images of a plurality of regions P9-1 and P9-2 from a multi-view image V9.

In this case, the controller 140 of the display apparatus 100 may transmit the image signal formed by cropping and reconfiguring the corresponding regions P9-1 and P9-2 in the multi-view image to the user terminal 500.

Meanwhile, a form in which the image signal transmitted to the user terminal 500 through the above-described operation is output to the user terminal 500 will be described below.

FIGS. 8 to 12 are views illustrating an output format of a user terminal according to an embodiment.

Figure 8:
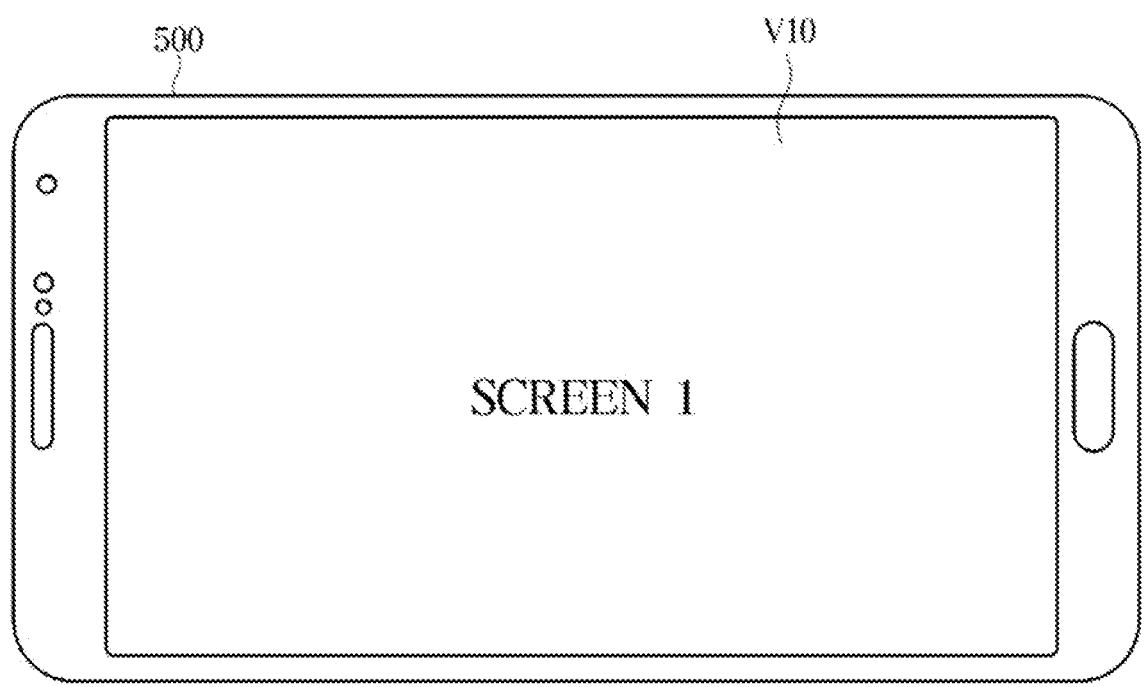
FIGS. 8, 9, 10, 11, and 12 are views illustrating an output format of a user terminal according to an embodiment.

Referring to FIG. 8, this is a view illustrating a state V10 when the user selects a single region in the multi-view image.

When the user selects a screen 1 from the multi-view image, the controller 140 may generate the image signal by cropping a portion corresponding to the screen 1 of the generated multi-view image and transmit it to the user terminal 500.

Figure 9:
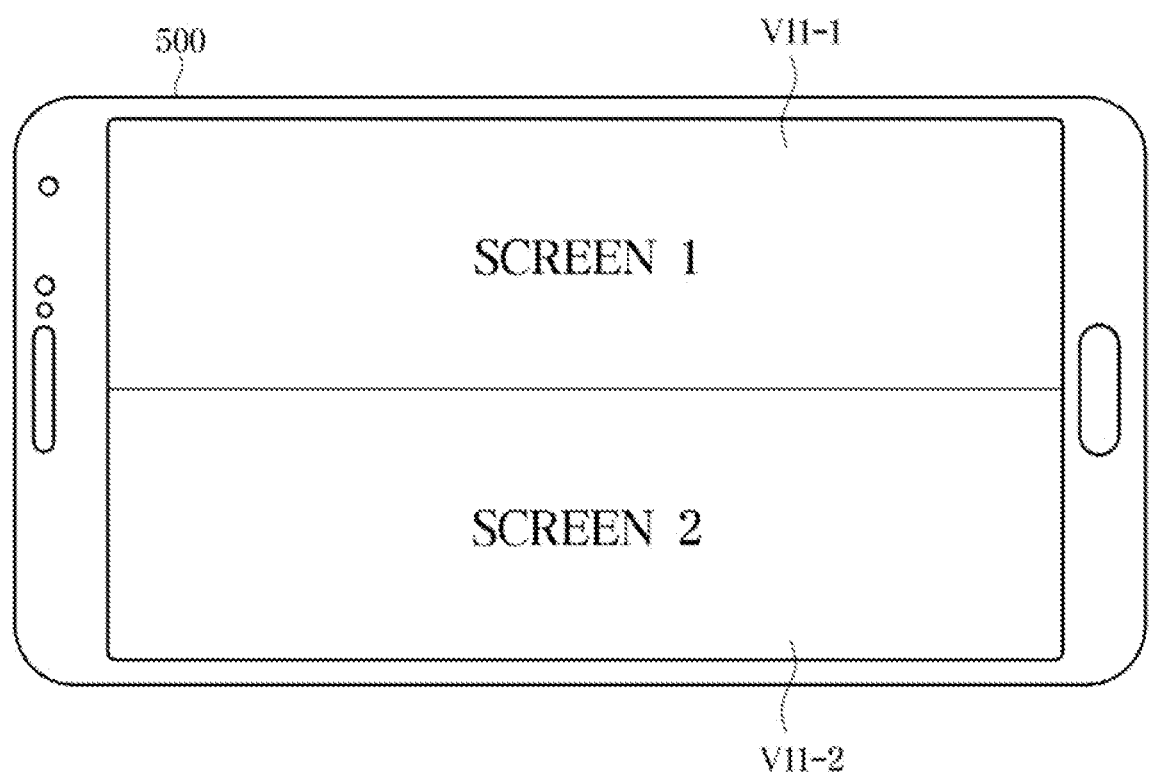
Figure 10:
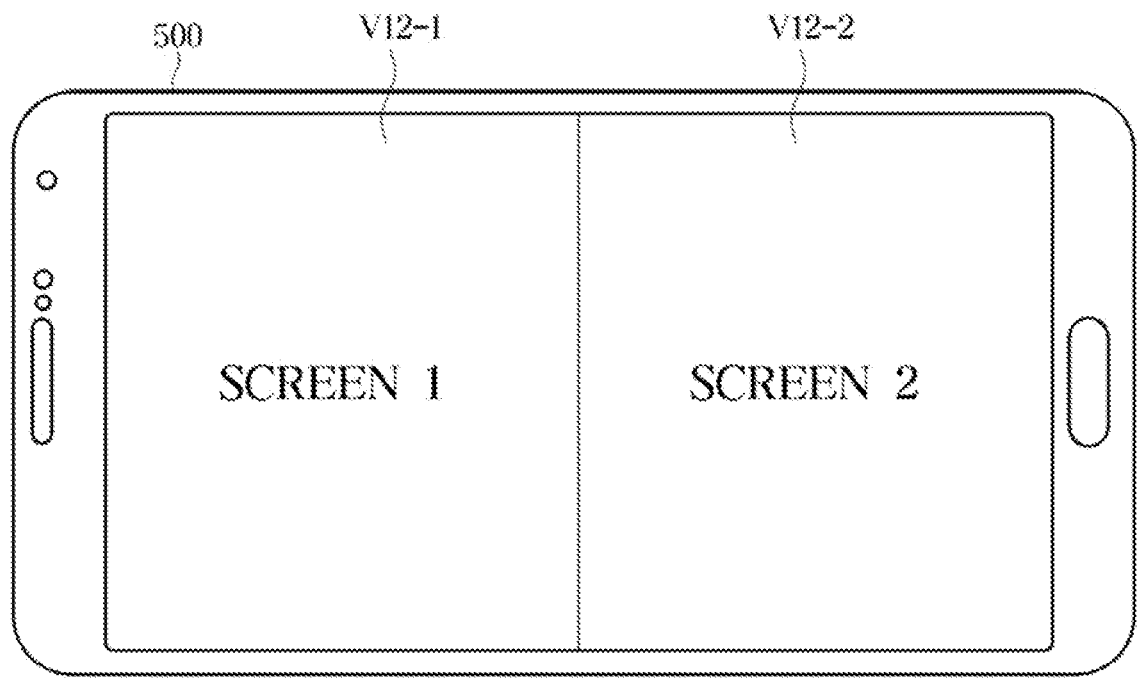

Meanwhile, FIGS. 9 and 10 illustrate that the user has selected the plurality of regions among the multi-view image.

When the user selects the plurality of regions among the multi-view images, the user may output the multi-view image of the plurality of regions to the user terminal 500.

Meanwhile, in this case, the controller 140 of the display apparatus 100 may arrange some of the multi-view images of the plurality of regions in the predetermined array.

Referring to FIG. 9, it illustrates that the screen 1 (V11-1) and a screen 2 (V11-2) selected by the user are arranged horizontally. When two screens are selected, the display apparatus 100 may output the array that is horizontally output.

Referring to FIG. 10, the screen 1 (V12-1) and the screen 2 (V12-2) selected by the user may be output in an array in which two predetermined screens are vertically arranged.

In other words, when the plurality of regions are selected in the multi-view image, there is no limit to the output format.

FIGS. 9 and 10 illustrate that the user selects two regions of the multi-view image and outputs the two regions to the user terminal 500, but there is no limit to the region that the user can select from the multi-view image.

Figure 11:
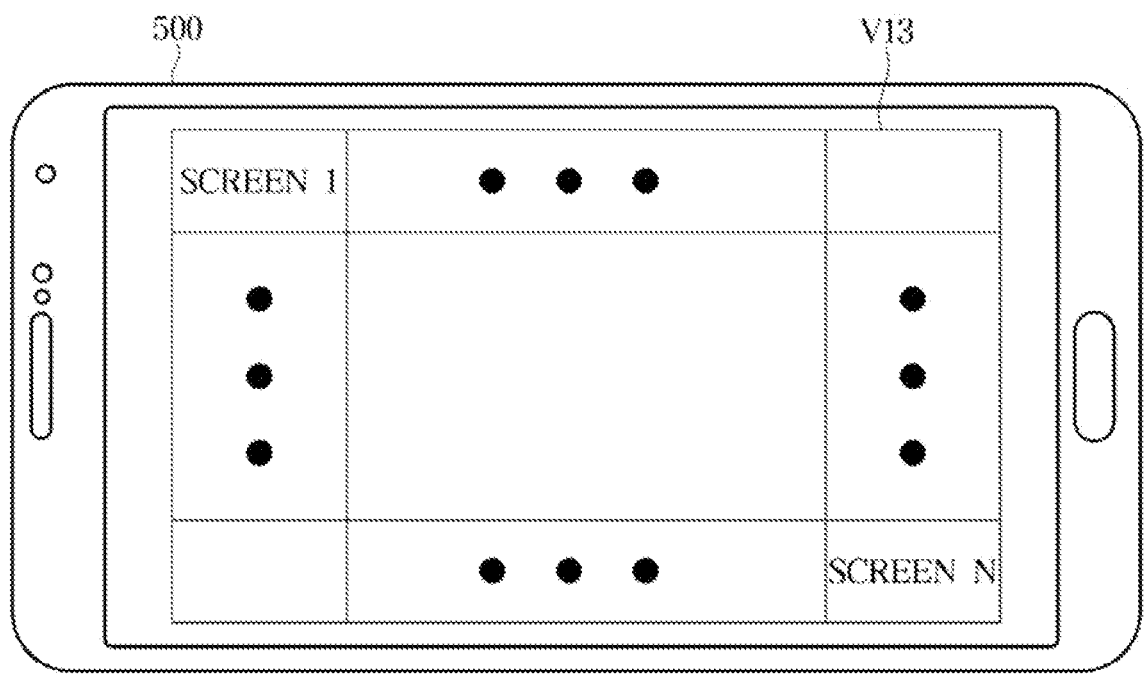

Meanwhile, FIG. 11 illustrates that a multi-view image itself V13 is output.

Figure 13:
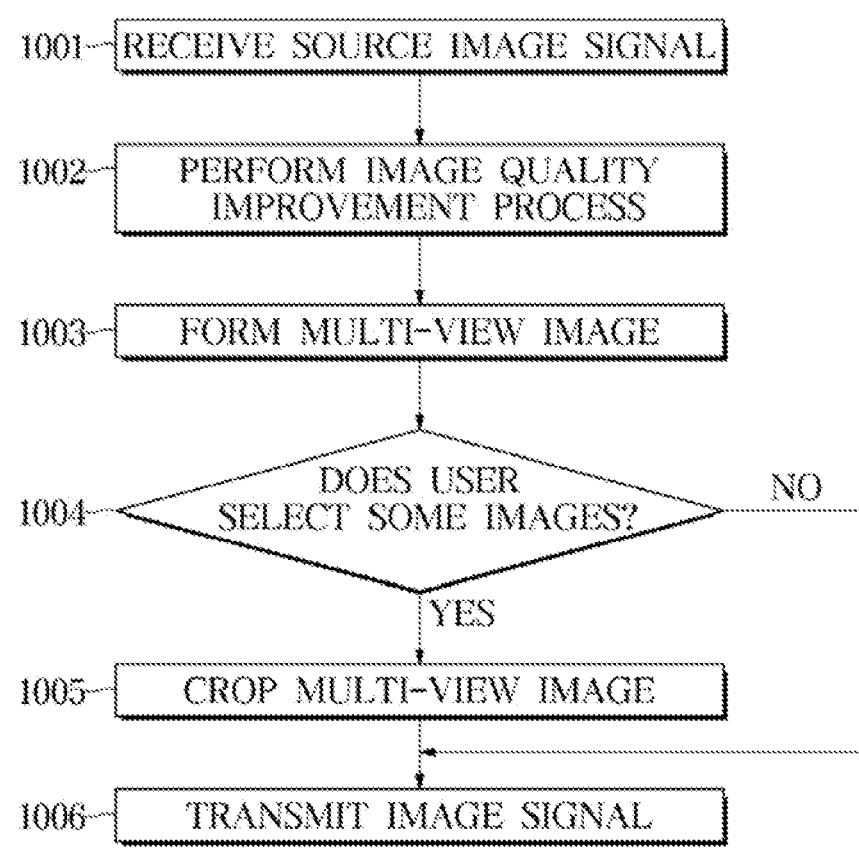
FIG. 13 is a flowchart according to an embodiment.

That is, the user terminal 500 receiving the image signal itself corresponding to the multi-view image generated by the display apparatus 100 may output the corresponding multi-view image. Meanwhile, when the multi-view image itself is output to the user terminal 500 as illustrated in FIG. 13, it may be output based on the reconstructed image signal, or may be output as the constant multi-view image signal.

Also, based on the output of the display itself, the output of the part of the multi-view image and the output of the multi-view image itself may be converted.

Meanwhile, when the image is output to the user terminal 500, the user may input a command to change the image.

Particularly, the user may change the image output to the user terminal 500 by dragging the image output to the user terminal 500 or scrolling with a mouse or the like.

Meanwhile, the above-described operation is merely an operation for describing an embodiment, and there is no limitation on the operation for selecting and outputting the multi-view image.

Figure 12:
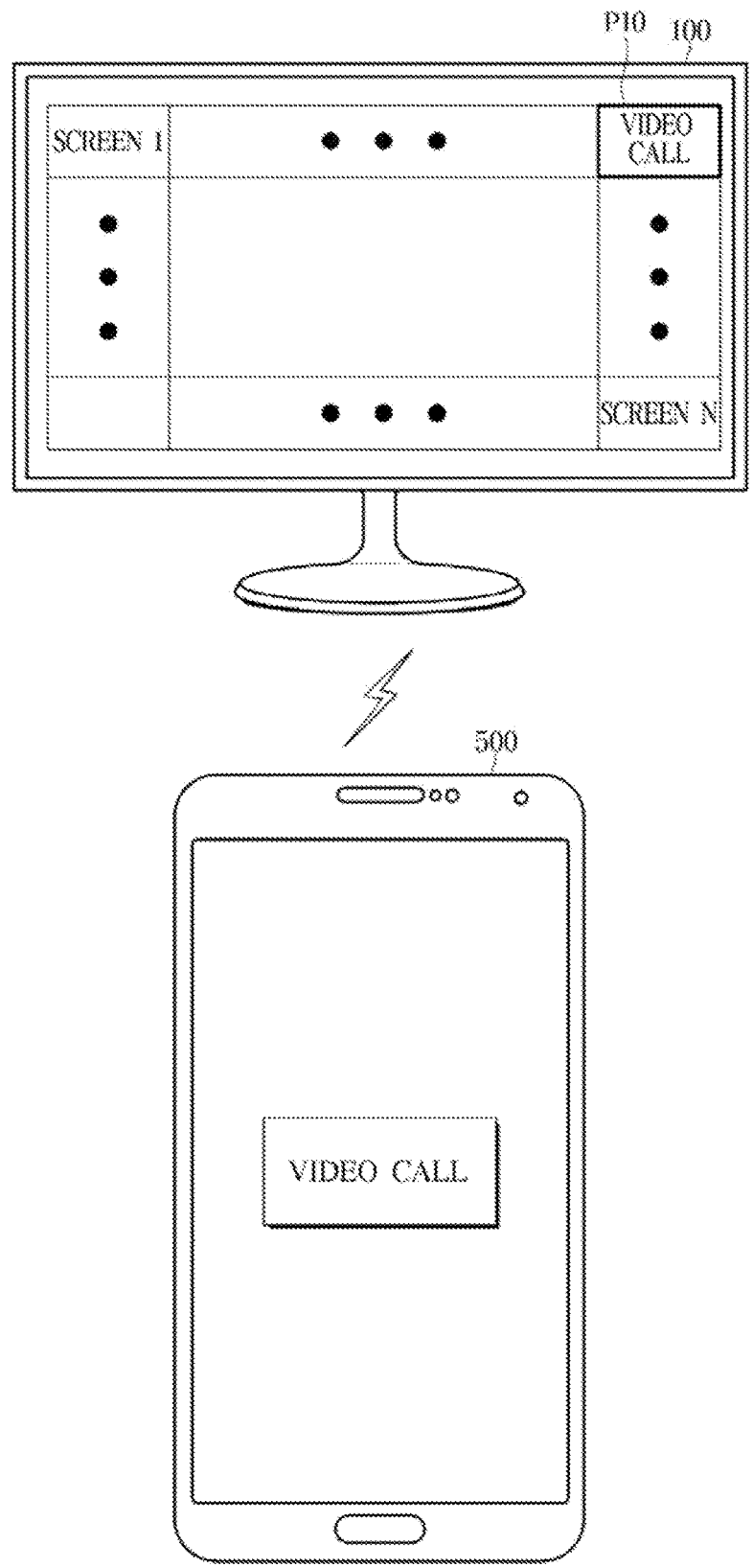

FIG. 12 is a view illustrating that an image P10 of the user terminal 500 is included in the multi-view image according to the embodiment.

The controller 140 may form the multi-view image including the image output to the user terminal 500.

Particularly, the display apparatus 100 receives a screen of a video call output to the user terminal 500 among the configuration of the multi-view image, and may be configured as one of the multi-view screens by replacing a screen P10 of a preset region.

FIG. 13 is a flowchart according to an embodiment.

Referring to FIG. 13, the display apparatus 100 may receive the source image signal (1001). The display apparatus 100 may perform the image quality improvement operation based on the received source image signal (1002).

The display apparatus 100 may form the multi-view image based on the image quality improvement (1003).

When the user selects some of the multi-view images (1004), the display apparatus 100 may crop the part of the multi-view images (1005) to form a final image signal and transmit it to the user terminal 500 (1006).

Meanwhile, when the user does not select some of the corresponding images, the display apparatus 100 may transmit the image signal corresponding to the multi-view itself to the user terminal 500 (1006).

According to the display apparatus and the method of controlling the display apparatus according to the embodiments, it is possible to provide various viewing environments and increase user convenience by outputting a part of the multi-view screen to the user terminal based on the user's selection.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus comprising:
   a display;
   a communication interface configured to communicate with a user terminal; and
   a controller configured to:
      generate a multi-view image including a plurality of contents by performing an image quality improvement process based on source image signals received from a plurality of sources,
      control the multi-view image to be displayed on the display,
      control the communication interface to transmit an image signal of the multi-view image to the user terminal,
      based on a user selection input which is received in the multi-view image displayed on the display and provides a selection of at least one of the plurality of contents displayed in the multi-view image on the display, crop a part of the multi-view image corresponding to the selected at least one of the plurality of contents, from the multi-view image, and
      control the communication interface to transmit, to the user terminal, an image signal corresponding to the cropped part of the multi-view image.

2. The display apparatus according to claim 1, wherein the controller comprises:
   an image quality controller configured to perform the image quality improvement process of the source image signals;
   a size controller configured to determine a resolution and size of the at least some of images included in the multi-view image;
   a frame controller configured to change a frame rate of the multi-view image; and
   a screen selector configured to select the part of the multi-view image based on a user command.

3. The display apparatus according to claim 2, wherein the image quality controller is further configured to perform the image quality improvement process based on an analysis of the source image signals.

4. The display apparatus according to claim 1, wherein the controller is further configured to form the image signal of the part of the multi-view image by performing encoding with a capacity suitable for transmission for the user terminal.

5. The display apparatus according to claim 4, wherein the user terminal is further configured to decode the received image signal of the part of the multi-view image into a decoded signal corresponding to the user terminal and output the decoded signal to a display of the user terminal.

6. The display apparatus according to claim 1, wherein:
   the communication interface is further configured to receive display information corresponding to a display of the user terminal from the user terminal; and
   the controller is further configured to convert the image signal of the part of the multi-view image to correspond to the display information and transmit the converted image signal to the user terminal.

7. The display apparatus according to claim 1, wherein the controller is further configured to transmit the image signal of the part of the multi-view image corresponding to an image in which the part of the multi-view image of a plurality of regions selected by a user is arranged in a predetermined array to the user terminal.

8. The display apparatus according to claim 6, wherein the controller is further configured to change the part of the multi-view image based on a user command.

9. The display apparatus according to claim 1, wherein the user terminal is configured to display an image based on the image signal of the part of the multi-view image, and
the controller is further configured to form the multi-view image so that the image displayed on the user terminal is included in the multi-view image.

10. A method of controlling a display apparatus, the method comprising:
communicating, via a communication interface, with a user terminal;
generating, by a controller, a multi-view image including a plurality of contents by performing an image quality improvement process based on source image signals received from a plurality of sources;
controlling, by the controller, the multi-view image to be displayed on a display;
controlling, by the controller, the communication interface to transmit an image signal of the multi-view image to the user terminal;
receiving a user selection input in the multi-view image displayed on the display, wherein the user selection input provides a selection of at least one of the plurality of contents displayed in the multi-view image on the display;
based on the user selection input providing the selection of the at least one of the plurality of contents, cropping a part of the multi-view image corresponding to the selected at least one of the plurality of contents, from the multi-view image; and
controlling, by the controller, the communication interface to transmit, to the user terminal, an image signal corresponding to the cropped part of the multi-view image.

11. The method according to claim 10, wherein the performing of the image quality improvement process comprises:
determining a resolution and size of the at least some of images included in the multi-view image; and
changing a frame rate of the multi-view image.

12. The method according to claim 10, wherein the performing of the image quality improvement process comprises:
performing the image quality improvement process based on an analysis of the source image signals.

13. The method according to claim 10, further comprising:
forming, by the controller, the image signal of the part of the multi-view image by performing encoding with a capacity suitable for transmission for the user terminal.

14. The method according to claim 13, further comprising:
decoding, by the user terminal, the received image signal of the part of the multi-view image into a decoded signal corresponding to the user terminal; and
outputting the decoded signal to a display of the user terminal.

15. The method according to claim 10, further comprising:
receiving, by the communication interface, display information corresponding to a display of the user terminal, from the user terminal; and
converting, by the controller, the image signal of the part of the multi-view image to correspond to the display information and transmitting the converted image signal to the user terminal.

16. The method according to claim 10, further comprising:
transmitting, by the controller, the image signal of the part of the multi-view image corresponding to an image in which the part of the multi-view image of a plurality of regions selected by a user is arranged in a predetermined array to the user terminal.

17. The method according to claim 16, further comprising:
changing, by the controller, the part of the multi-view image based on a user command.

18. The method according to claim 10, wherein the user terminal is configured to display an image based on the image signal of the part of the multi-view image, and
the method further comprises:
forming, by the controller, the multi-view image so that the image displayed on the user terminal is included in the multi-view image.

* * * * *